(12) United States Patent
White et al.

(10) Patent No.: US 7,308,090 B2
(45) Date of Patent: Dec. 11, 2007

(54) CONFERENCE CALL FACILITY

(76) Inventors: Christopher White, 4 Streets Heath, West End Woking, Surrey, GU24 9QZ (GB); Peter Courtney, 19 Oakleigh Park Avenue, Chislehurst, Kent, BR7 5PB (GB)

( * ) Notice: Subject to any disclaimer, the term of this patent is extended or adjusted under 35 U.S.C. 154(b) by 0 days.

(21) Appl. No.: 10/545,215

(22) PCT Filed: Feb. 11, 2004

(86) PCT No.: PCT/EP2004/050115

§ 371 (c)(1),
(2), (4) Date: Jun. 5, 2006

(87) PCT Pub. No.: WO2004/073288

PCT Pub. Date: Aug. 26, 2004

(65) Prior Publication Data

US 2006/0250987 A1    Nov. 9, 2006

(30) Foreign Application Priority Data

Feb. 11, 2003  (GB) ................................ 0303080.6

(51) Int. Cl.
*H04M 3/42* (2006.01)
(52) U.S. Cl. .............. 379/202.01; 370/261; 348/14.08; 348/14.09; 709/204; 715/753
(58) Field of Classification Search ........... 379/202.01; 370/261; 348/14.08, 14.09; 709/204; 715/753
See application file for complete search history.

(56) References Cited

U.S. PATENT DOCUMENTS 6,275,575 B1 *   8/2001   Wu ...................... 379/202.01

2002/0173319 A1   11/2002   Fostick
2003/0021238 A1   1/2003    Corneliussen et al.
2003/0035381 A1 * 2/2003    Chen et al. ................. 370/261

FOREIGN PATENT DOCUMENTS

| GB | 2376608    | 12/2002 |
| JP | 2000350176 | 12/2000 |
| WO | WO 0131964 | 3/2001  |
| WO | WO 0201836 | 1/2002  |

* cited by examiner

*Primary Examiner*—Quynh H. Nguyen
(74) *Attorney, Agent, or Firm*—Allen, Dyer, Doppelt, Milbrath & Gilchrist, P.A.

(57) ABSTRACT

A conference call is established in response to receiving a request 4 from a first communication terminal 3a. The request 4 preferably is an SMS or MMS and comprises one or more identifiers 5, 6, 7, e.g. telephone numbers, relating to a plurality of other communication terminals 3b-3d. A conference call server I allocates a conference call channel and an associated identifier, such as a telephone number. Messages 10a-10c alerting the conference participants are then sent to the other communication terminals 3a-3c, each message including the identifier associated with the conference call channel. Access to the conference call may be restricted to authorised users by compating identifiers, such as CLIs, of incoming callers to the identifiers provided in the request 4 and allowing access only if there is a correspondence or match. In the event that an incoming caller has withheld their CLI, or it is otherwise nondeterminable, access is refused and a message may be sent reminding conference participants who have yet to join the conference call not to withhold this information. Alternatively, the server calls the participants at the appropriate time.

24 Claims, 6 Drawing Sheets

CONFERENCE CALL FACILITY

FIELD OF THE INVENTION

The invention relates to the provision of a conference call facility and is particularly suitable for, but not limited to, establishing conference calls between mobile telephone users via a wireless communication network.

BACKGROUND OF THE INVENTION

Communication systems often provide conference call facilities, allowing a telephone call to be shared by three or more users. In one known system, a first user, or host, calls a conference call facility to request a conference, specifying a date and time for the conference call. A telephone number is then allocated to the conference and communicated to the host for distribution to the other participants. At the appointed time, the participants dial the telephone number to join the conference. The participants may also be given a password, so that access to the conference is restricted to users selected by the host.

EP-A-1164774 discloses a system in which a conference call can be initiated by the sending of a suitable SMS to a server at a preset telephone number, with invitees being notified by SMSs sent from the server. The conference call can be joined by the invitees dialing a telephone number included in the body of the SMS invitations. However, it has been found that it is not necessarily a simple matter for an invitee to dial into the conference call. Also, it is relatively easy for invitees not to receive invitation SMSs immediately, which can prevent them joining the conference call or joining it at an appropriate time.

SUMMARY OF THE INVENTION

According to a first aspect of the invention, there is provided a method of establishing a conference call, comprising: receiving a request at a conference call service provider from a first communication terminal, the request comprising one or more identifiers relating to a plurality of other communication terminals; and in response to the request, allocating a conference call channel, associating an identifier with the conference call channel and sending a message from the conference call service provider to said other communication terminals, each message containing the conference call channel identifier as the message originator.

The other communication terminals then receive a message identifying the conference call channel as the originator of the message, e.g. by its telephone number. Using this invention, cost and convenience benefits can be experienced by the user of the first communication terminal. This allows the other communication terminals easy access to the conference call.

This may be done by including an identifier, such as the telephone number associated with the conference call channel, in a header of the message so that, where a recipient of the message is equipped with a suitable communication terminal, the recipient can join the conference call using a short-cut defined in the communication terminal, reducing the number of keystrokes necessary for the recipient to access the conference call.

The method may comprise subsequently initiating from the conference call service provider a telephone call to each of said other communication terminals. This is convenient in some circumstances, since it provides increased certainty that all, or most, of the participants will be joined in the conference call at an appropriate time.

Furthermore, the provision of security procedures is facilitated as access to the conference call can be limited to users of communication terminals identified in the request. For example, an identifier, such as a Calling Line Identification (CLI) associated with a communication terminal determined to be attempting to access the conference call channel may be compared with a list of identifiers associated with communication terminals that are allowed access to the conference call, where access is permitted only if the identifier associated with said communication terminal corresponds to an identifier on said list. If the identifier of a communication terminal attempting to access the conference call is withheld or is otherwise non-determinable, a message can be sent to all communication terminals identified in the request that have not yet joined the conference to notify them that access can only be granted if this information is provided.

Preferably, one or both of the request and the message are in the form of a text message, such as a Short Message Service (SMS) message. This allows the inclusion of further text in the request, for example a short message explaining the subject of the conference call. The text may then be included in the message sent to the participants. If one or both of the request and the message is a multimedia message, image, video and/or audio data can also be used to explain the conference call or matters surrounding it.

According to a second aspect of the invention, there is provided apparatus for providing a conference call facility comprising: a receiver for receiving a request from a first communication terminal, said request containing one or more identifiers relating to a plurality of other communication terminals; an allocator for allocating a conference call channel and associating an identifier with the conference call channel in response to the request; and a message generator for preparing and sending a message to said other communication terminals, each message containing an indication that the message originates from the conference call channel.

According to a third aspect of the invention, there is provided a method of restricting access to a conference call channel comprising: compiling a list of identifiers associated with communication terminals to be joined on a conference call; determining whether an identifier associated with a first communication terminal attempting to access the conference call channel corresponds to an identifier on the list; allowing access to the conference call channel if the identifier of the first communication terminal corresponds to an identifier on said list; and disallowing access to the conference call channel if the identifier of the first communication terminal does not correspond to any of the identifiers on the list wherein, if the identifier of the first communication terminal is withheld or is otherwise non-determinable, a message is sent to all communication terminals associated with identifiers on said list that have not accessed the conference call channel.

By using an identifier associated with a communication terminal attempting to join the conference call, the provision of access codes or passwords to the conference participants becomes unnecessary, which may result in increased convenience for users and/or improved security. The identifier is preferably a telephone number, which may be determined from a CLI.

According to a fourth aspect of the invention, there is provided apparatus for restricting access to a conference call channel, comprising: a compiler configured to compile a list of identifiers associated with communication terminals to be joined on a conference call; a determiner configured to determine whether an identifier of a first communication terminal attempting to access the conference call channel corresponds to an identifier on the list; an access grantor configured to allow access to a conference call channel if the identifier of the first communication terminal corresponds to an identifier on said list and to disallow access to the conference call is channel if the identifier of the first communication terminal does not correspond to any of the identifiers on the list; and a message generator configured to prepare and send a message to all communication terminals associated with identifiers on the list that are not connected to the conference channel if the identifier of the first communication terminal has been withheld or is otherwise non-determinable The invitation messages do not need to contain the conference call channel identifier as the message originator, since the conference call channel identifier can be communicated instead The invention also provides a communication system comprising any of the above apparatus.

Embodiments of the invention will now be described by way of example only with reference to the following drawings.

DESCRIPTION OF THE EMBODIMENTS

Figure 1:
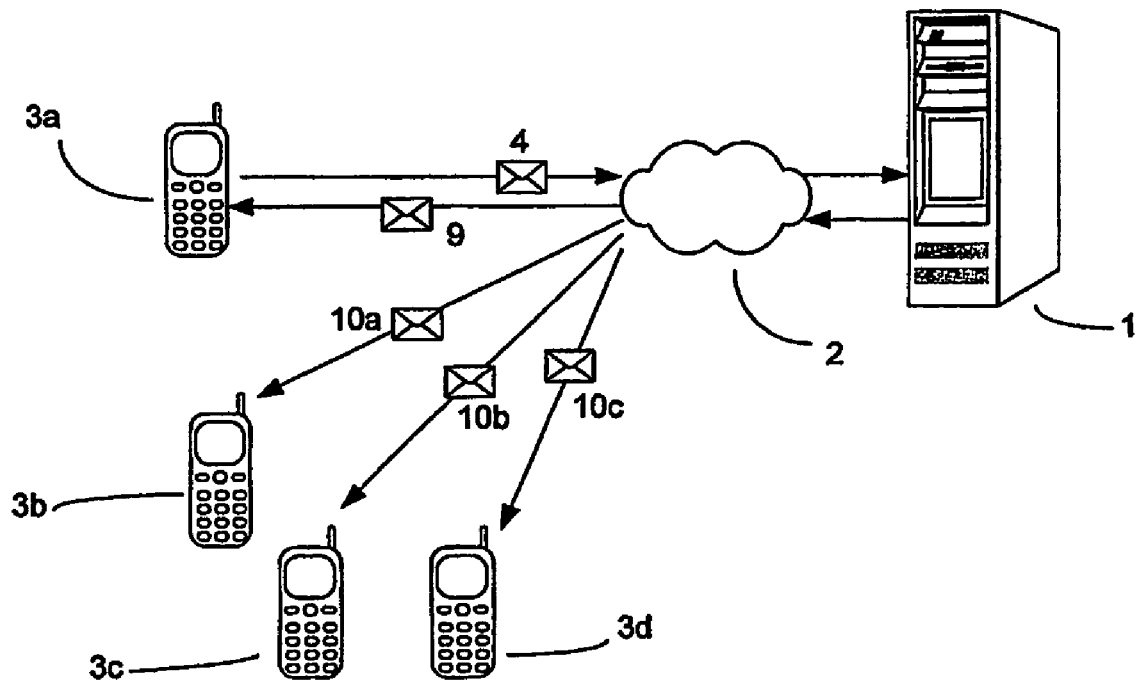
FIG. 1 shows a communication system according to the present invention.

A communication system is shown in FIG. 1, comprising a conference call server 1 and a network 2, which may comprise plural interconnected networks. The network 2 comprises at least one Mobile Switching Centre (MSC) and at least one Short Message Service Centre (SMSC), as well as the other usual components of a mobile telephone network, none of which are shown.

The conference call server 1 provides communication channels for conference calls between a plurality of communication terminals, which, in this example, are mobile telephones 3a-3d. The conference call server 1 is arranged such that it is perceived by the network 2 as a self-contained mobile network with a single Global Title and Point Code.

Figure 2:
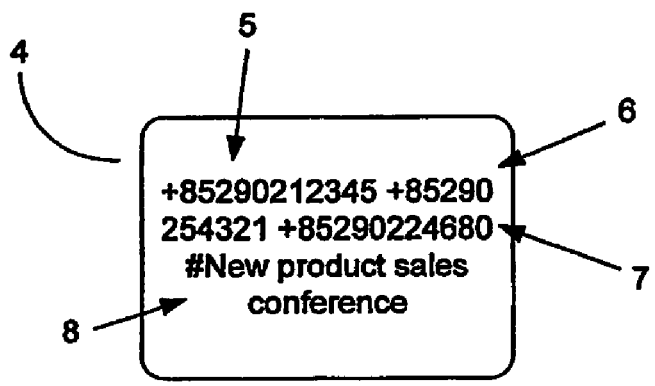
FIG. 2 shows a request in the form of an SMS message.

A user of a communication terminal 3a wishing to set up a conference call makes a request 4 using a Short Message Service (SMS) message, shown in FIGS. 1 and 2. The request 4 contains a list of the telephone numbers 5, 6, 7 of other participants to be invited to take part in the conference call. This list may be followed by optional text 8, e.g. text identifying the subject of the conference. The optional text is separated from the list of telephone numbers by a # symbol. The header of the request 4 includes a field identifying the sender of the message, as is conventional with SMS messages. In this case, the field contains the telephone number of the mobile telephone 3a from which the request 4 was sent.

The request 4 is addressed to a telephone number that has previously been allocated for allowing access to the conference call facility. The request 4 is directed to an MSC associated with the network 2, where it is acknowledged in a well-known manner and forwarded to the conference call server 1, since the network 2 perceives the conference call facility telephone number as belonging to the conference call server 1.

A procedure for preparing a conference call will now be described, with reference to FIG. 3, beginning at step s3.0. The request is received (step s3.1) and checked for errors. If there are no fatal errors, the request is acted on as follows. The conference call server 1 reserves a conference call channel and other resources necessary for hosting the conference call (step s3.2). This is achieved using a database held on the conference call server 1 or on a separate computer (not shown), selecting a virtual telephone number from a pool of available telephone numbers and assigning it to the conference call In a preferred embodiment, the conference call server 1 compiles a list of the telephone numbers 5, 6, 7 of the conference participants (step s3.3) from the information provided in the request 4. The conference call server 1 includes in the list the telephone number of the mobile telephone 4 from which the request 4 was sent. The list may be subsequently used to help prevent unauthorised access to the conference call.

The conference call server 1 subsequently generates an SMS message for the user of the communication terminal 3a, confirming that the conference has been created and notifying the user of the assigned telephone number. To achieve this, a message header is generated (step s3.4), a field in which indicates the source of the message. This field is set to indicate the telephone number of the conference call channel as the source of the message. The message body then is provided with the virtual telephone number assigned to the conference call, along with any optional text 8 included in the request 4 (steps s3.5, s3.6, s3.7). The confirmation message is then sent to the mobile telephone 3a that sent the request (step s3.8) and is shown at 9 in FIG. 1.

The conference call server 1 then generates invitation messages inviting the remaining participants to join the conference call. Headers of these invitation messages are generated such that the field indicating the source of the message contains the telephone number of the conference call channel (step s3.9). Bodies of the invitation messages contain the telephone number of the conference call to channel, text indicating that the message is an invitation to join a conference call and any optional text 8 extracted from the request (steps s3.10, s3.11, s3.12). The invitation messages are then sent to the mobile telephones 3b-3d (step s3.13) and are shown at 10a-10c in FIG. 1.

The confirmation and invitation messages 9, 10a-10c are sent directly from the conference call server 1 to the mobile telephones 3a-3d. If any of the messages are not delivered successfully, the conference call server 1 may make further attempts to send the messages for a limited period.

The preparation of the conference call is then complete (step s3.14).

As the headers of the confirmation message 9 and invitation messages 10a-10c show the conference call channel as the sender of the message 9, 10a-10c, a recipient may be able access the conference using a short-cut defined on their mobile telephone 3a-3d. For example, many mobile telephones currently available are configured to call the sender of a message if the user presses a "call" button twice when the message is displayed.

Figure 4:
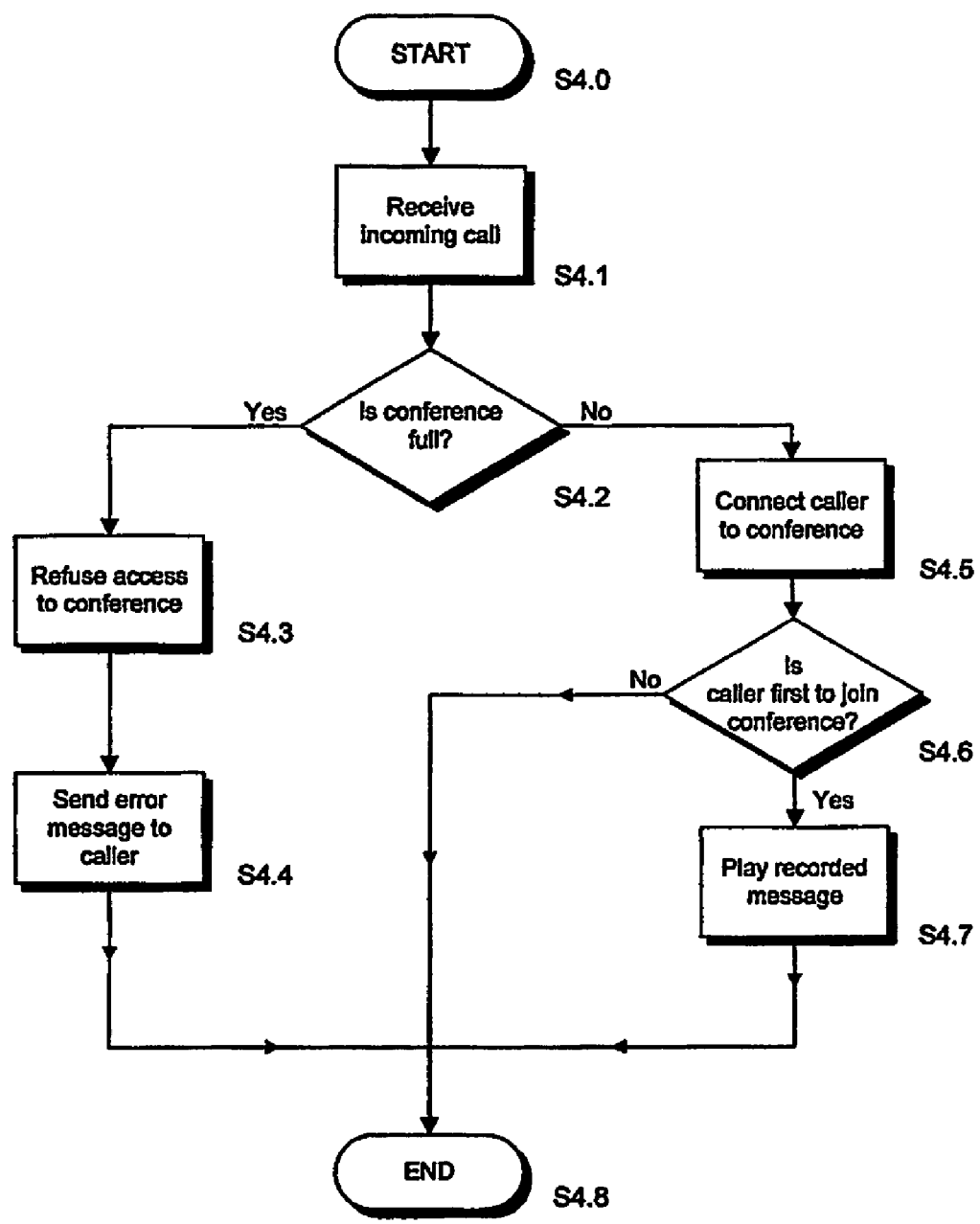
FIG. 4 is a flowchart showing the connection of a communication terminal to a conference call according to a first embodiment of the invention.

A procedure for connecting a caller to a conference call according is shown in FIG. 4, beginning at step s4.0. When an incoming call directed to the conference call channel is received (step s4.1), because a caller has dialled the telephone number assigned to the conference call, the conference call server 1 checks whether the conference is full (step s4.2). The conference call is full if the number of telephones connected to the conference call channel already exceeds the number of invitation messages 10a-10c sent by the conference call server, to allow for the number of invitees plus the user who sent the request 4, or, where a list of telephone numbers of participants has been compiled (step 3.3), the number of entries in that list. If the conference call is full, the incoming caller is refused access (step s4.3) and an error message is sent to the caller (step s4.4). If the conference call is not full the caller is connected (step s4.5) and, if required, a welcome message is played to the caller. If the caller is the first to join the conference (step s4.6), a further recorded message is played (step s4.7) asking the caller to wait for other participants to join the conference call.

The connection procedure is then complete (step s4.8). The same procedure is followed in respect of each caller who dials the telephone number assigned to the conference call.

When the conference call has been completed and the users have been disconnected, the conference call channel and the virtual telephone number assigned to it are returned to the pool. Any further attempts to send confirmation and/or invitation messages 9, 10a-10c are stopped at this time.

Figure 5:
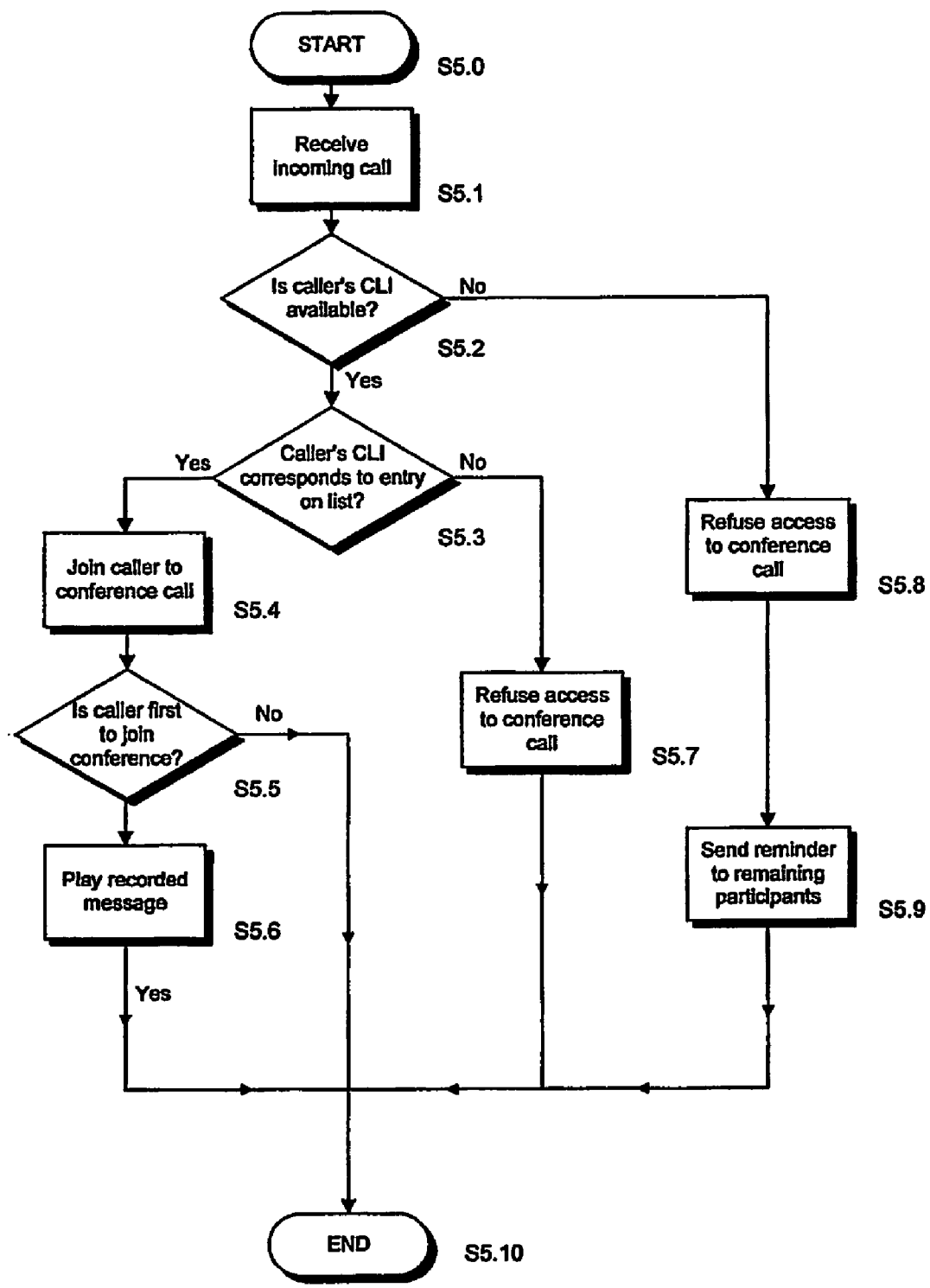
FIG. 5 is a flowchart showing the connection of a communication terminal to a conference call according to a second embodiment of the invention.

In order to reduce the likelihood that an uninvited caller may dial the assigned virtual telephone number and be connected to the conference call, the number of virtual telephone numbers in the pool may be considerably larger than the number of available conference call channels. Alternative, or additional, security measures may be implemented. For example, the confirmation and alert messages 9, 10a-10c can include passwords or codes that a user must provide in order to access the conference call.

Where a list of the telephone numbers of the conference participants has been compiled (step s3.3), it is possible to use this list and an identifier of a caller dialling the telephone number assigned to the conference call, such as the callers CLI, to determine whether to allow them access to the conference call. An alternative procedure for connecting a caller to a conference, including this procedure, is shown in FIG. 5.

Beginning at step s5.0, a call to the conference call channel is received at the conference call server 1 (step s5.1). The conference call server 1 determines whether the caller's CLI is available (step s5.2). If so, the conference call server 1 compares the caller's CLI with the telephone numbers on the list (step s5.3). If the caller's CLI corresponds to one of the telephone numbers listed, the caller is connected to the conference call (step 5.4). A welcome message may be played to the caller at this point. If the caller if the first to join the conference (step s5.5), a recorded message is played, asking them to wait for other participants to be connected (step s5.6).

If the caller's CLI does not correspond to an entry on the list (step s5.3), they are refused access to the conference call (step s5.7) and the caller is not connected thereto.

If the caller's CLI is not available (step s5.2), for example if the CLI has been withheld by the caller, access to the conference call is refused (step s5.8). A further text message may then be sent to all the mobile telephones 3a-3d identified on the list who have yet to join the conference reminding them that their CLI should not be withheld (step s5.9). A user receiving this message may then enable the CLI feature on their mobile telephone before dialling, or re dialing the conference call number.

The connection procedure is then complete (step s5.10).

Figure 6:
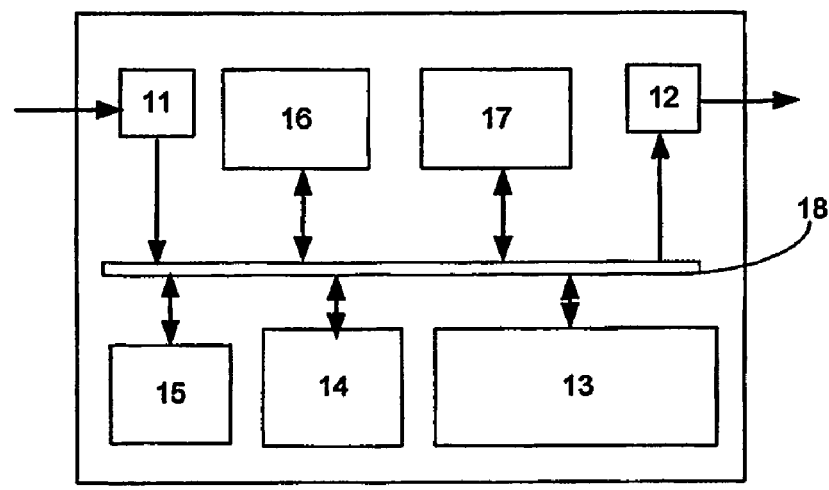
FIG. 6 is a block diagram of a conference call facility for use in the communication system of FIG. 1.

An example of a suitable conference call server 1 is shown schematically in FIG. 6. The conference call server 1 comprises an input interface 11 for receiving data from an external source and an output interface 12. A processor 13 monitors and controls operations. A memory facility 14 is provided for storing application software and, optionally, a database relating to the conference call channels and virtual telephone numbers provided by the conference call facility. An access processor 15 determines whether to allow the caller access to a conference can, by determining whether the conference is full as in the procedure of FIG. 4 or by extracting CLI information from incoming calls and using this information according to the procedure of FIG. 5. Requests 4 are forwarded to a request handler 16, which compiles the list of conference participants, if required, and reserves the conference call channel and virtual telephone number. A message generator 17 prepares and sends confirmation and invitation messages 9, 10a-10c. A data bus 18 provides a communication path between these components 11-17. The conference call server 1 may be implemented on a conventional server apparatus.

Figure 7:
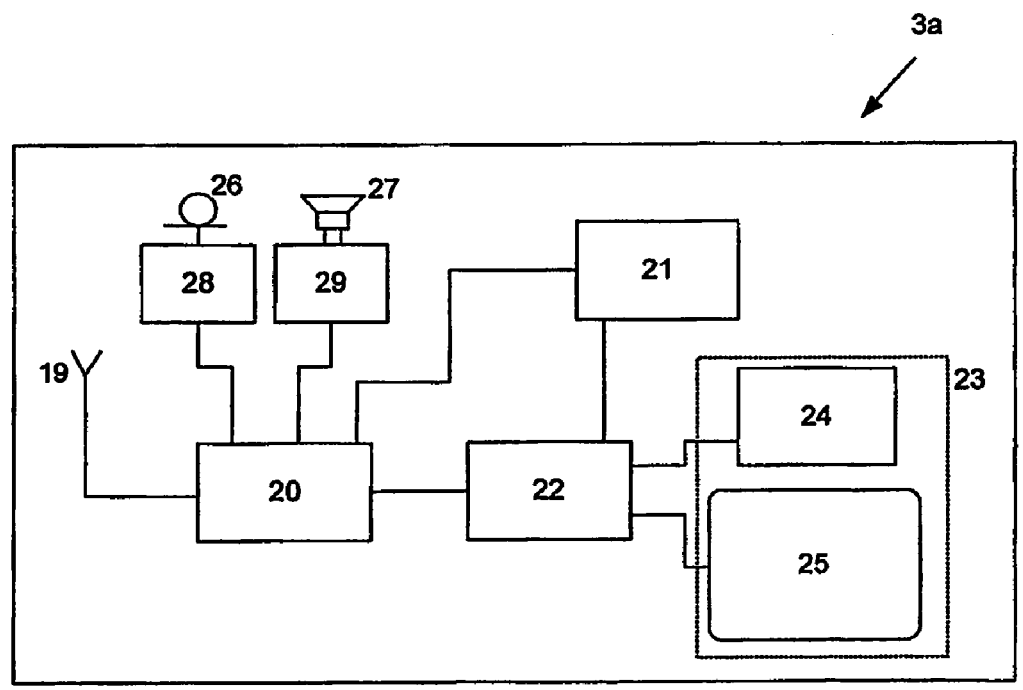
FIG. 7 is a block diagram of a communication terminal for use in the to communication system of FIG. 1.

A suitable mobile telephone 3a is shown schematically in FIG. 7. The mobile telephone comprises an antenna 19, a transceiver 20, a receiver 21 and a controller 22. A user interface 23 comprises a keypad 24 and a display 25. A microphone 26 and speaker 27 are provided, together with associated amplifiers 28, 29. The mobile telephone 3a also includes other conventional features of mobile telephone handsets, but these are omitted from FIG. 7 for the sake of clarity.

The confirmation message 9 and invitation messages 10a-10c may be identical and may not require separate generation processes. Alternatively, different invitation messages 10a-10c may be sent to the conference participants. In a further embodiment of the invention, the user requesting the conference call may not receive a confirmation message 9, but instead be dialled directly by the conference call server 1. The confirmation 9 and/or invitation messages 10a-10c as well as the request 4 may not be SMS messages and may take another form of text message, such as multimedia messages (MMSs), e-mails or instant messages. Alternatively, the confirmation 9 and/or invitation messages 10a-10c may take the form of a voice message. The request may alternatively be made through a website. For example, a website associated with the conference call server 1, or even running in the same server apparatus, could allow entry of data in a number of separate fields. Such fields could be: the name of the call organiser, the mobile telephone number of the call organiser, a description (for example the subject of the proposed conference call), and a number of fields for the telephone numbers of the invitees.

Once these fields are filled-in and an "OK" button selected, the data is sent as a request message to the computer hosting the website, and from there onto the conference call server 1 if this is located in separate apparatus.

The communication terminals may be identified by, for example, an IP address, an MSISDN or other identification instead of, or as well as, telephone numbers and CLIs. The communication terminals may also be identified as a group, for example using a group IP address or a group of telephone numbers defined in a user's communication terminal 3a. In one example, a user can predetermine a group and to store the telephone numbers of the members of the group on the conference call server 1 together with an identifier, e.g. "sales team". The members of the group may then be invited to join a conference call by the sending of a request including the identifier, which is then understood by the conference call server 1 to require a conference call including all the members of the group.

In one embodiment, MMS is used for the request. Here, the MMS request comprises a number of parts, namely text (comprising at least the telephone numbers of the proposed recipients), an audio clip and an image. The image can relate to the user of the terminal 3a setting up the conference call, and can for example be a photograph of the user. Modern mobile telephones often include digital cameras, so this can be relatively easy to achieve. As well as or instead of a still image, the request may include a video clip. The audio clip and/or any video clip can be pre-recorded, or can be recorded immediately before creation of the MMS request.

The conference call server 1 acts on the MMS request similarly to the SMS request of the embodiment described above. In particular, the conference call server extracts the telephone numbers of the participants to be invited. The conference call server 1 then generates invitation messages inviting the remaining participants to join the conference call. Headers of these invitation MMSs are generated such that the field indicating the source of the message contains the telephone number of the conference call channel. The body of each invitation MMS comprises a text section including the telephone number of the conference call channel, text indicating that the message is an invitation to join a conference call and any other text extracted from the request MMS. The body also includes the image and the audio clip included in the request MMS. The invitation MMSs are then sent to the mobile telephones 3b-3d, as with the messages 10a-10c in FIG. 1. This allows additional prompts to be delivered to invitees to the conference call. The image might remind the invitee who the call initiator is. The audio clip may be able to include more information, for example about the subject and content of the proposed conference call, than could be included in an SMS because of the length limitations associated with SMSs. Additionally, this can be more convenient, since it is usually easier and quicker to record a message than to type it using a keypad of a mobile telephone.

The confirmation message 9 need not be an MMS, and could be an SMS or other type of message. The server 1 may have to distinguish between different mobile telephone types, and send MMSs to those capable of handling MMSs and send SMSs to the other telephones.

Figure 3:
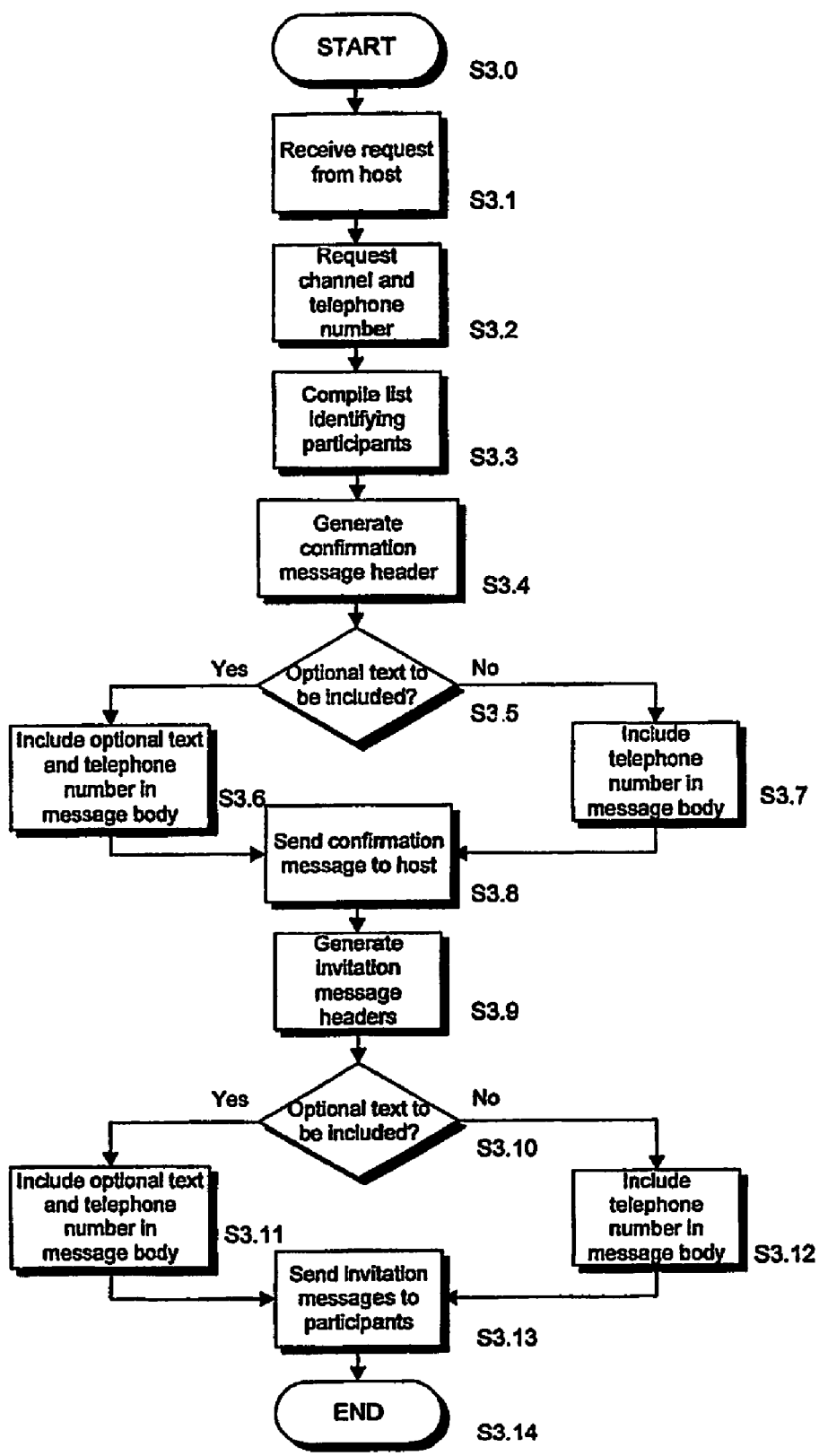
FIG. 3 is a flowchart showing the establishment of a conference call.

This embodiment can be envisaged as an extended version of the method shown in FIG. 3. Here, steps s3.6 and S3.7 also include attaching an audio clip and/or an image to the MMS request. Steps s3.11 and S3.12 also include attaching any audio clip and image to the invitation MMS. Of course, it may not be necessary to include both an audio clip and an image in a request MMS or an invitation MMS, and MMS handling applications in mobile telephones do not usually require both to be included.

In a further embodiment, the conference call server 1 sends a different type of invitation message to the participants to the call. Briefly, the conference call server 1 sends invitation messages which comprise a notification of a conference call, and indicate when the call is to take place. The invitation messages do not necessarily need to include an identifier by which the conference call number can be dialled, since the conference call server 1 calls all the participants at the scheduled time. This allows increased certainty that participants to the call will be joined, since it eliminates the possibility of delay in the delivery of invitation messages having the result of preventing an invitee receiving the invitation message at a suitable time. Also, it is more difficult for an invitee to ignore an incoming call than it is to ignore an SMS, MMS, e-mail or the like.

Figure 8:
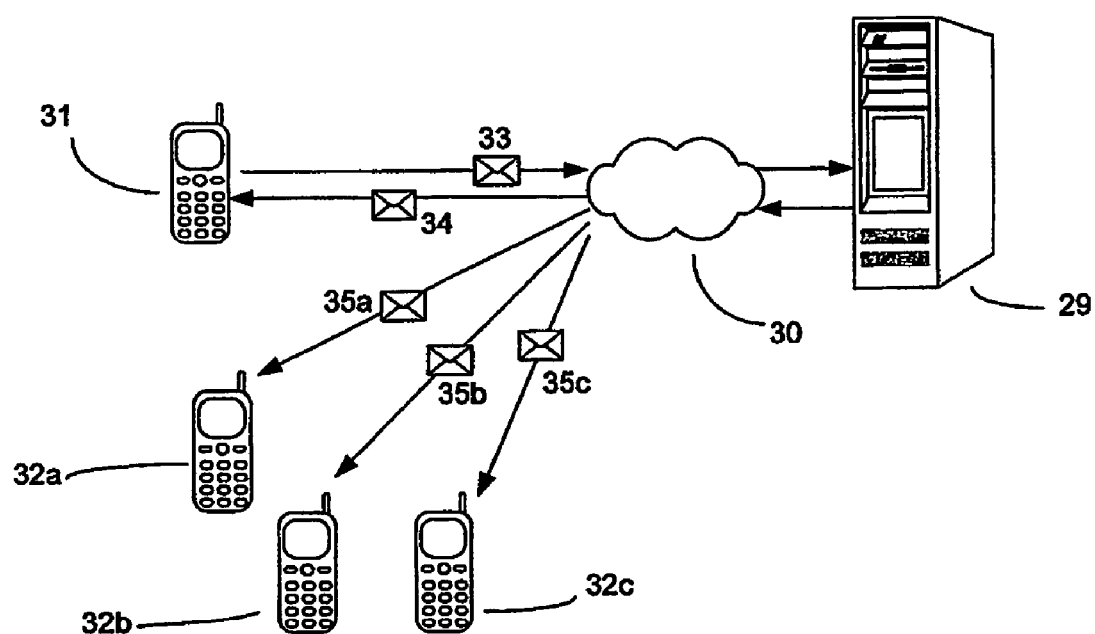
FIG. 8 shows an alternative communication system according to the present invention.

This embodiment will now be described with reference to FIG. 8. A communication system is shown in FIG. 8, comprising a conference call server 29 and a network 30, which includes all the usual components of a mobile telephone network, none of which are shown.

The conference call server 29 provides communication channels for conference calls between a plurality of communication terminals, which in this example are mobile telephones 31 and 32a-32c. The conference call server 29 is arranged such that it is perceived by the network 2 as a self-contained mobile network with a single Global Title and Point Code.

A user of the communication terminal 31 wishing to set up a conference call makes a request 33 using an SMS, MMS or other message. The request 33 contains a list of the telephone numbers of other participants to be invited to take part in the conference call, or alternatively a group identifier, and optionally additional text, image(s) and/or audio. The request also identifies the time at which the conference call is to take place. This may be either through the specifying of a time (and optionally a date) or alternatively through the specifying of period before the call is to commence. The header of the request 33 includes a field identifying the telephone number of the sender 31.

The request 33 is addressed to a telephone number that has previously been allocated for allowing access to the conference call facility. The request 33 is forwarded to the conference call server 29 by the network 30.

The request is handled substantially as shown in and described with reference to FIG. 3, except that it is not necessary to include in a confirmation 34 or in invitation messages 35a to 35c any virtual telephone number assigned to the conference call. The conference call server 29 also determines the time at which the conference call is to take place, by calculating when any period expires if necessary.

The confirmation and invitation messages 34, 35a-35c prepared by the server 29 indicate the time when the conference call is to commence. The confirmation and invitation messages 34, 35a-35c are sent directly from the conference call server 29 to the mobile telephones 31, 32a-32c.

If the confirmation and invitation messages 34, 35a-35c are sent some time before the conference call is to take place, reminder messages (also indicated at 34 and 35a-35c) are sent at one or more suitable times between the sending of the confirmation and invitation messages and the time of the conference call. For example, the conference call server 29 can be arranged to send separate reminder messages 34, 35a-35c at two hours, one hour and ten minutes before the conference call time. These reminder messages 34, 35a-35c may be the same as the confirmation and invitation messages 34, 35a-35c, although preferably they indicate that they are reminder or subsequent messages, to minimise the chances that a recipient could think the message relates to a different conference call.

One or more of the messages 34, 35a-35c sent to each of the mobile telephones 31 and 32a-32c includes the virtual telephone number allocated to the conference call as the originator of the message. This ensures that each of the intended participants in the conference call has knowledge of the telephone number which needs to be dialled to access the call should they become cut-off, or should they not be accessible or available when the conference call commences. Advantageously, only the last message 34, 35a-35c sent to each of the mobile telephones 31 and 32a-32c includes the access telephone number of the conference call. This provides a more secure solution than one in which the conference call access telephone number is made available to the participants in the conference call earlier, since it results in a shorter period of time in which an unauthorised person could illegitimately obtain the conference call access telephone number and attempt to access the conference call covertly. However, the conference call access telephone number can be sent to the mobile telephones 31 and 32a-32c in one or more earlier messages 34, 35a-35c if such levels of security are not required.

If any of the messages are not delivered successfully, the conference call server 29 may make further attempts to send the messages for a limited period.

At the allotted time, the conference call server 29 dials the telephone numbers of all the participants to the call, including the invitees 32a-32c and the initiator 31, and joins all the calls together, thereby completing the creation of the conference call. Here, it is unnecessary to check that those attempting to access a conference call are authorised.

If any participant is unavailable when the conference call server 29 dials the participants to the call (for example because there is insufficient signal strength to maintain a network connection), they can access the call by using the call number facility on their mobile telephone 31 and 32a-32c from the last-received SMS or other invitation message 34, 35a-35c which was received. In this case, the conference call server 29 examines the CLI of any person dialling into the conference call and ensures that they are legitimate before allowing access.

The conference call server 29 can be the same as that shown in FIG. 6, except that the access processor 15 is supplemented with a participant dialler, or initiator, which dials the invitees 32a-32c and the initiator 31 at the allotted time. The conference call server 29 may be implemented on a conventional server apparatus.

The conference call server 29 may additionally be provided with means for deducting a charge for the calls to the participants from a pre-paid account, or for billing the charge to a suitable entity.

In another embodiment, the conference call servers 1 and 29 are combined into a single server. Here, conference calls can be dealt with as in the FIG. 1 embodiment or in the FIG. 8 embodiment in dependence on the telephone number which was used to access the service, i.e. the telephone number to which the request 4 or 33 was addressed. Furthermore, a different access number can be allocated for conference calls relating to different individuals or organisations, providing a tool useful for billing and other account related purposes.

The embodiments described are merely examples showing how the invention may be implemented. The invention is not limited to use with mobile telephones and mobile telephone networks and may be used to provide conference call services to other types of communication terminals, such as so-called landline or wired telephones, personal computers and any other device equipped with voice communication facilities.

The invention claimed is:

1. A method of establishing a conference call in a system comprising a conference call service provider, a first communication terminal and a plurality of other communication terminals, the method comprising:
   receiving a request at a conference call service provider from said first communication terminal, in which said request comprises plural identifiers, in which each of said plural identifiers relates to a different one of said plurality of other communication terminals;
   in response to receiving said request comprising plural identifiers:
      at the conference call service provider, allocating a conference call channel,
      at the conference call service provider, associating an identifier with said conference call channel, and
      sending a message from the conference call service provider to said plurality of other communication terminals; and
   at said conference call service provider, subsequently connecting each of said other communication terminals to the conference call channel.

2. A method according to claim 1, wherein the connecting step comprises initiating from the conference call service provider a telephone call to each of said other communication terminals.

3. A method as claimed in claim 2, wherein said request identifies a conference call start time at which the conference call is to be started, and the initiating step occurs at substantially said conference call start time.

4. A method according to claim 1, wherein a message containing the identifier associated with the conference call channel is sent to the first communication terminal in response to the request.

5. A method according to claim 1, wherein the request is a short text message or a multimedia message.

6. A method according to claim 1, wherein each message sent by the conference call service provider to said other communication terminals is a short text message or a multimedia message.

7. A method according to claim 6, wherein a body of the message includes the identifier associated with the conference call channel.

8. A method according to claim 6, wherein the message further includes at least one of: additional text, image and audio data forming part of the request.

9. A method according to claim 1, wherein the identifiers relating to the communication terminals are telephone numbers.

10. A method according to claim 1, wherein each message contains the conference call channel identifier as the message originator and preferably wherein the conference call channel identifier is a Calling Line Identification associated with the conference call channel.

11. A method according to claim 1, further comprising:
   comparing an identifier associated with a communication terminal determined to be attempting to access the conference call channel with a list of identifiers relating to communication terminals allowed to access the conference call channel; and allowing access to the conference call only if the identifier associated with said communication terminal corresponds to an identifier on said list.

12. A method according to claim 11, further comprising, in response to a determination that an identifier associated with a communication terminal attempting to access the conference call channel is withheld or is otherwise non-determinable, sending a further message to all communication terminals identified in the request that are not connected to the conference call channel.

13. Apparatus for providing a conference call facility, the apparatus comprising:
   a receiver for receiving a request from a first communication terminal, said request containing plural communication terminal identifiers, each of said plural communication terminal identifiers relating to a different one of a plurality of other communication terminals;
   an allocator responsive to the request comprising plural identifiers being received at the receiver for allocating a conference call channel, and for associating a conference call channel identifier with the conference call channel;
   a message generator for preparing and sending a message to each of said other communication terminals; and
   means for subsequently connecting the other communication terminals to the conference call channel.

14. Apparatus according to claim 13, wherein each of said messages contains an indication that the message originates from said conference call channel, and preferably wherein the indication is a Calling Line Identification associated with the conference call channel.

15. Apparatus according to claim 13, further comprising an access restrictor configured to:
   compare an identifier, said identifier being associated with a communication terminal determined to be attempting to access the conference call channel, with a list of communication terminal identifiers relating to communication terminals allowed to access the channel; and
   allow access to the conference call only if the identifier associated with said communication terminal corresponds to a communication terminal identifier on said list.

16. Apparatus according to claim 15, wherein said access restrictor is configured so that, in response to a determination that an identifier associated with a communication terminal attempting to access the conference call channel is withheld or is otherwise non-determinable, a further message is sent to all communication terminals identified in the request that are not connected to the conference call channel.

17. Apparatus according to claim 13, further comprising:
   an initiator arranged to initiate a telephone call to each of said other communication terminals.

18. Apparatus as claimed in claim 17, wherein said request identifies a conference call start time at which the conference call is to be started, and said initiator is arranged to initiate said telephone calls at substantially the conference call start time.

19. Apparatus according to claim 13, wherein said message generator is configured to send a message containing said conference call channel identifier to the first communication terminal in response to the request.

20. Apparatus according to claim 13, wherein said receiver is a short text or multimedia message receiver.

21. Apparatus according to claim 13, wherein each message is a short text message or a multimedia message.

22. Apparatus according to claim 13, wherein each message is a short text message or a multimedia message and wherein said message generator is configured to include said conference call channel identifier in a body of each message.

23. Apparatus according to claim 13, wherein said message generator is configured to include at least one of additional text, image and audio data forming part of said request in a body of the message.

24. Apparatus according to claim 13, wherein the communication terminal identifiers are telephone numbers.

* * * * *